Figure 7:
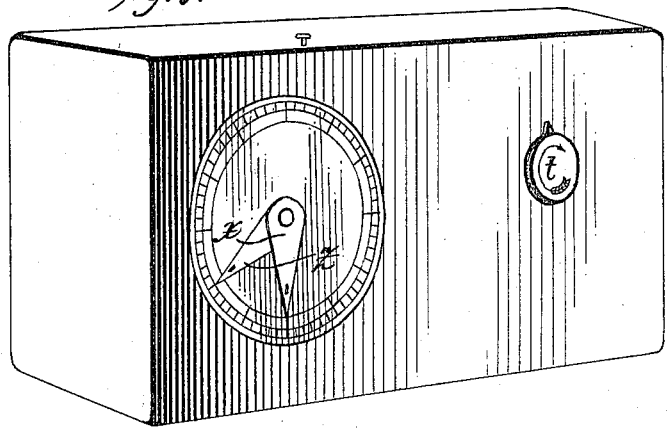

H. C. ATWOOD.
SHUTTER OPERATING ATTACHMENT FOR PHOTOGRAPHIC CAMERAS.
APPLICATION FILED MAR. 21, 1913.
1,181,364.
Patented May 2, 1916.
2 SHEETS—SHEET 1.
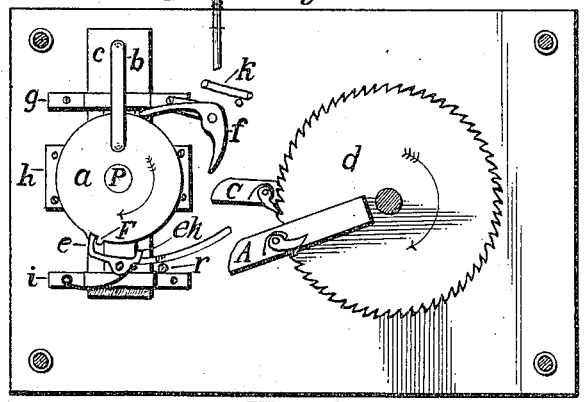
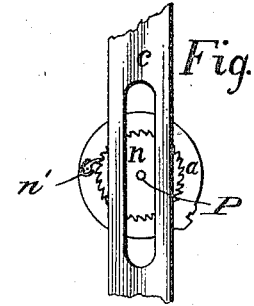
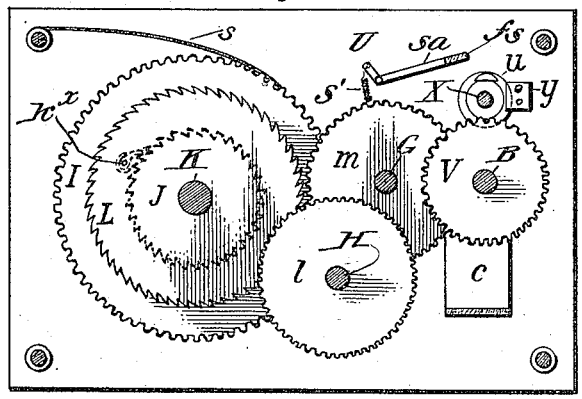
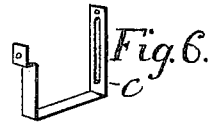
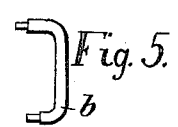
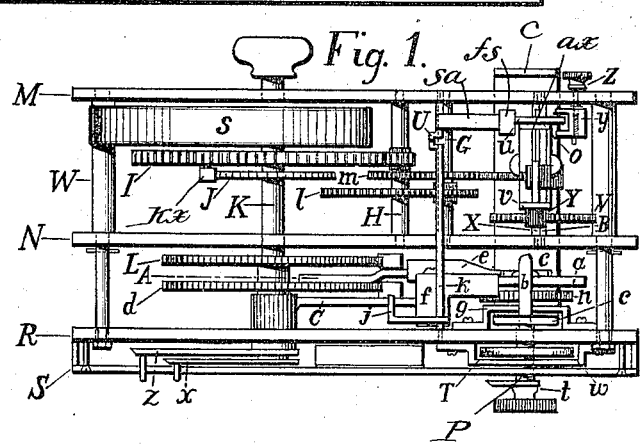
Witnesses.
Clark N Lowell
Roy Price
Inventor.
Harry C. Atwood H. C. ATWOOD.
SHUTTER OPERATING ATTACHMENT FOR PHOTOGRAPHIC CAMERAS.
APPLICATION FILED MAR. 21, 1913.

1,181,364.

Patented May 2, 1916.
2 SHEETS—SHEET 2.

Witnesses.

Inventor.

UNITED STATES PATENT OFFICE.

HARRY C. ATWOOD, OF NOCONA, TEXAS, ASSIGNOR OF ONE-FIFTH TO L. G. PERKINS, OF NOCONA, TEXAS.

SHUTTER-OPERATING ATTACHMENT FOR PHOTOGRAPHIC CAMERAS.

1,181,364.  Specification of Letters Patent.  Patented May 2, 1916.

Application filed March 21, 1913. Serial No. 755,933.

*To all whom it may concern:*

Be it known that I, HARRY C. ATWOOD, a citizen of the United States, residing at Nocona, in the county of Montague and State of Texas, have invented a new and useful Shutter-Operating Attachment for Photographic Cameras, of which the following is a specification.

My invention relates to an auxiliary attachment in the form of a small mechanical device, which may be attached to any photographic camera whose shutter is operated by a thumb-lever, and being so connected with said lever that the operator may at will set the mechanical arrangement of said attachment in motion, thereby causing it to operate the shutter of the photographic camera to which it is attached, giving any desired time of exposure, within certain limitations, at any desired time, within certain limitations, after the mechanical arrangement of said attachment has been set in motion, thus giving the correct desired time of exposure, and also permitting the operator to place himself within the range of the photographic camera before the shutter of said camera is operated and the exposure made.

The objects of my invention are, first, the provision of an attachment for photographic cameras which is designed to operate the shutter of the photographic camera to which it is attached, giving the correct time of exposure, whereby with ordinary photographic cameras the operator is required to approximate the length of time the shutter is held open; second, to enable the operator to set the attachment to give a certain desired length of exposure at a certain desired length of time after the mechanical arrangement of said attachment has been set in motion, thereby allowing the operator any specified length of time, within certain limitations to place himself within the range of the photographic camera to which said attachment is connected, and thus be a part of the objects included within the range of said photographic camera when the exposure is made; third, the construction of a shutter operating device which may be attached to any photographic camera, whose shutter is operated by a thumb-lever, such photographic camera not being already provided with such means of shutter operation. I attain these objects by the mechanism illustrated in the accompanying drawings, in which—

Figure 8:
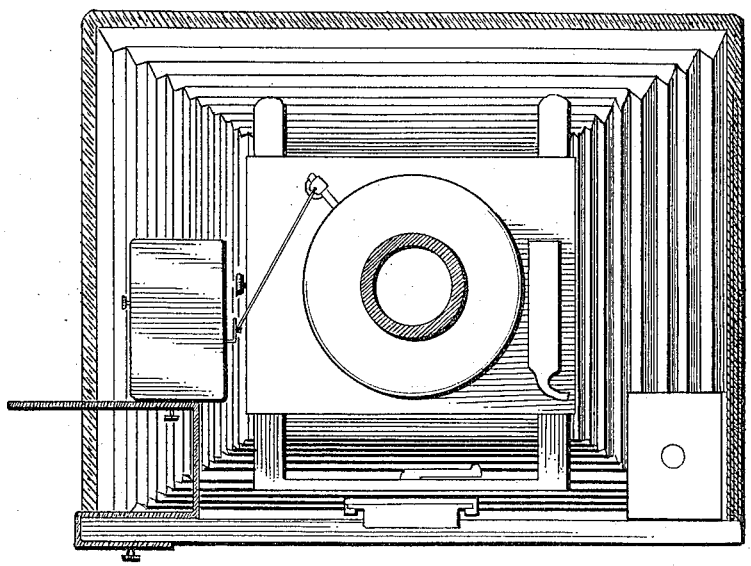

Figure 1 is a top view showing the mechanism after the outside case has been removed; Fig. 2 is a side view of the inside mechanism, after having the front plate R, and middle plate N, shown in Fig. 1, and parts attached thereto, removed, showing the arrangement of the cog-wheels in the gearing and other parts; Fig. 3 is a view of the front plate R shown in Fig. 1, removed from the other mechanism and carrying with it the various parts of the inside mechanism which work on or are attached to it; Fig. 4 is a side view of the disk $a$, shown in Fig. 3, showing the construction of the parts as they work in relation to the disk $a$ in Fig. 3 and the front plate R in Fig. 1; Fig. 5 is a side view of the connecting bar $b$, shown in Fig. 3, one end of which is fitted in a bearing in the disk $a$ in Fig. 3, and the other end is fitted in a bearing in the slide $c$, shown in Fig. 3; Fig. 6 is a perspective view showing the construction of the slide $c$, shown in Fig. 1 and sectionally shown in Fig. 2 and Fig. 3; Fig. 7 is a perspective view of the attachment when completed inclosed in its case, showing the projecting parts and the dial and indicator hands; Fig. 8 is a front elevation showing the method of attaching the device to a photographic camera for operation.

Similar letters refer to similar parts throughout the several views.

The main supporting frame of the inside mechanism consists of three plates, M, N, R, shown in Fig. 1, placed parallel to each other and supported and connected by four posts, W, one placed at each corner of the plates, the ends of the posts entering the plate M being securely riveted thereto; at the point on the posts where the plate N is placed, the diameter of the posts are reduced continuous to the end, forming a shoulder thereon, the smaller ends of the posts thus formed being inserted through holes of proper diameter placed in proper position at each corner of the plate N, allowing the plate N to rest against the shoulders thus formed on the posts W, said plate being held in position against the shoulders by pins inserted through the diameter of said posts; by a similar reduction in the diameter of the posts W at their smaller ends, another shoulder is formed, against which the plate R rests, which plate is held in position by nuts which are fitted on the end of each post, the end of each post being fitted with threads for that purpose.

The shaft K, shown in Fig. 1, carrying the main driving gear I, passes through the plate M, and plate N, which plates serve as supports and bearings for said shaft, and extends outward flush with the indicator hand $x$. The end of the shaft K passing through the plate M is fitted with a flat thumb-bolt for turning the shaft K and winding up the coil spring $s$, the central end of which spring is secured to the shaft K and the outer end to the post W, said spring furnishing the power for operating the gearing. The cog-wheel I turns freely on the shaft K, the ratchet-wheel J being secured to the shaft K, and having a pawl $kx$, held in position by a suitable spring, attached to the cog-wheel I, as shown in Fig. 2, which pawl engages with the teeth on the ratchet-wheel J. The cog-wheel I gears in a pinion secured to the shaft H, which shaft has its bearings in the plate M and plate N respectively; the cog-wheel $l$, also secured to the shaft H, gears in a pinion on the shaft G, which pinion is secured to the shaft G, said shaft having its bearings in the plate M and plate N respectively; the cog-wheel $m$, which is secured to the shaft G, gears with a pinion on the shaft B, which pinion is secured to the shaft B, said shaft having its bearings in the plate M and plate N respectively; the cog-wheel V, which is secured to the shaft B, gears with a pinion Y, which pinion is secured to the shaft X, said shaft carrying the governor, or speed regulator, and having its bearings in the plate M and plate N respectively.

The governor, or speed regulator, consists of a disk $v$, which is secured to the shaft X, directly in contact with the pinion gear Y; also a similar disk $o$, which disk is free to slide toward either end of shaft X, said shaft from the center of its length outward to the point where it enters the plate M, being square, and the disk $o$ having a central opening of similar size and shape, thus preventing the disk $o$ from rotating on the shaft X, but allowing it to move freely toward either end of shaft X at this point. At opposite points on the diameter of the disk $v$ and disk $o$ a flat, narrow strip of spring metal of suitable strength is attached, in the center between the two ends of which a piece of metal of suitable weight is attached; secured to the disk $o$ is a similar disk $u$, but of larger diameter, which is virtually a part of the disk $o$; the thumb-screw Z, which has its bearing in the plate M, is provided with screw threads from the point where the shank leaves the plate M continuous to the end of said shank, the friction-block $y$ being provided with similar threads into which the thumb-screw Z enters, a pin being inserted through the diameter of the shank of said thumb-screw next to the inner side of the plate M, to hold said thumb-screw in proper position; beneath the point where the thumb-screw Z enters the friction-block $y$, a hole of suitable diameter is placed, into which a post of similar diameter enters, parallel to the thumb-screw Z, as shown in Fig. 2, said post being securely fitted into the plate M, allowing the friction-block $y$ to slide freely on said post, the function of said post being to act as support and guide to the friction-block $y$; on the side of the friction-block $y$ having its position next to the circumference of the disk $u$, an opening is formed, leaving a flat side of said friction-block extending on each side of the disk $u$ parallel to the sides of said disk, said opening being of sufficient width to allow ample room on each side of the disk $u$, for allowing said disk to rotate freely therein. When the shaft X is caused to rotate by means of the spring $s$ and the subsequent gearing, as heretofore explained, the centrifugal force caused by the rotation of said shaft, tends to increase the diameter of the circle described by the metal weights secured to the flat strips of spring metal which are attached to opposite sides of the circumference of the disk $v$ and disk $o$, as shown in Fig. 1 and previously explained, thus shortening the distance in a straight line between the two ends of the strips of spring metal, and consequently drawing the disk $o$, and disk $u$ attached thereto, toward the point where the disk $v$ is secured to the shaft X, in distance proportionate to the speed at which the shaft X is rotated. When the shaft X is rotated at sufficient speed to cause the disk $u$ to come in contact with the corresponding side of the friction-block $y$, the friction caused by such contact tends to check the speed of the shaft X, and consequently when the friction on the disk $u$ is sufficiently reduced by a reduction in the speed of the shaft X, said shaft again has a tendency to increase its speed in accordance with the pressure of the disk $u$ against the side of the friction-block $y$, and thus a practically uniform speed of the shaft X is maintained, in accordance with the degree of pressure maintained by the disk $u$ against the side of the friction-block $y$, such pressure being regulated by moving the friction-block $y$ toward either end of the shaft X by means of the thumb-screw Z.

The ratchet-wheel L is secured to the shaft K; the ratchet-wheel $d$, which is secured to a sleeve of sufficient diameter to admit the shaft K, such sleeve extending through the plate R, and to the outer end of which the indicator hand $x$ is secured, rotates on the shaft K, and on one side of which ratchet-wheel, extending from the center outward, an arm is securely attached, as shown in Fig. 3, carrying a pawl thereon, held in position by a suitable spring, which pawl engages in the teeth on the ratchet-wheel L; the arm C is also secured to a sleeve of sufficient diameter to admit the sleeve to which the ratchet-wheel $d$ is secured, and rotating thereon, said sleeve extending through the plate R, and to the outer end of which the indicator hand $z$ is secured, the said arm C carrying a pawl, held in position by a suitable spring, which ratchet engages in the teeth on the ratchet-wheel $d$; the ratchet-wheel $d$ and the arm C turn about the shaft K in the direction indicated by the arrow in Fig. 3.

The disk $a$, shown in Fig. 3, is free to turn on the shaft P, which shaft extends through the slide-guide $h$, shown in Fig. 3, through the plate R, and through the supporting brace $w$ and face plate S, shown in Fig. 1, the slide-guide $h$ and the supporting brace $w$ acting as supports and bearings for the shaft P, the outer end of said shaft being provided with a thumb-head $t$, and having an indicator hand attached thereto, said thumb-head being secured to said shaft P, and serving as a means of turning said shaft; at a certain point on the circumference of the disk $a$, a projection F is formed, as shown in Fig. 3, which, when said disk rotates in the direction indicated by the arrow in Fig. 3, engages with the catch-lever $e$ and catch-lever $f$, at different intervals, which catch-levers are held in position by suitable springs, have as their fulcrum and are held in position by, posts of suitable size and length. The function of said catch-levers is to stop the movement of said disk $a$ at certain points in its rotation; near the point on the disk $a$ where the projection F is formed, a similar but smaller projection is also formed, but in reverse position to the projection F, forming an opening between the two projections of sufficient width to freely admit the outer projection of the catch-lever $e$, the function of the smaller projection being to prevent the disk $a$ from turning in reverse direction when the shaft P is turned by means of the thumb-head $t$ for winding up the coil spring T; the catch-lever $e$, as shown in Fig. 3, is formed with two projections, one on each side of its fulcrum, the one at the end of said catch-lever being termed the outer projection, and the other the inner projection, the inner projection being slightly shorter than the outer projection; the function of the inner projection is to act as a safety to prevent the projection F on the disk $a$ from passing the outer projection on the catch-lever $e$, when said disk is allowed to make a full revolution, after said catch-lever $e$ has been raised by the arm A to release the disk $a$, before the outer projection on the catch-lever $e$ is in proper position to again engage with the projection F on said disk. The end of the catch-lever $e$, which comes in contact with the arm A, is so formed as to prevent the arm C from coming in contact with it, and likewise the end of the catch-lever $f$ which comes in contact with the arm C, is so formed as to prevent the arm A from coming in contact with it. A post $r$ is securely fitted in the plate R, in proper position to prevent the catch-lever $e$ from coming in contact with any part of the circumference of the disk $a$, except the projection F and its similar opposite projection.

The disk $a$, as heretofore explained, is free to turn on the shaft P, being held in position by a cap on the end of said shaft, as shown in Fig. 1; secured to the shaft P at a point between the disk $a$ and the slide-guide $h$, is a ratchet-wheel $n$, as shown in Fig. 4, said ratchet-wheel being of smaller diameter than the disk $a$, a pawl $n'$, held in position by a suitable spring, being attached to the inner side of the disk $a$, which engages in the teeth on said ratchet-wheel; between the support $w$ and the plate R, as shown in Fig. 1, a coil spring T of suitable strength is placed, the central end being attached to the shaft P, and the outer end to a suitable post securely fixed in the plate R. When the shaft P is turned in the direction indicated by the arrow in Fig. 7, by means of the thumb-head $t$, shown in Fig. 1, the coil spring T is wound up, being prevented from unwinding by the ratchet-wheel $n$ and its pawl $n'$, allowing the disk $a$ to remain in a fixed position, until released by the catch-lever $e$, when the action of said coil spring T forcing the shaft P, and the ratchet-wheel $n$ secured thereto, to revolve in opposite direction to that in which the shaft P is rotated to wind the coil spring T, the teeth on the said ratchet-wheel engaging the ratchet or pawl attached to the said disk $a$, causes it to revolve with the shaft P, in the direction indicated by the arrow in Fig. 3, until arrested by the catch-lever $f$ or catch-lever $e$, respectively. The function of the catch-lever $f$ is to arrest the further rotation of the disk $a$, until the arm C forces said catch-lever out of position and releases said disk.

In order to stop the rotation of the disk $a$ after one revolution when the slide $c$ has made a quick reciprocatory movement, as for instance, when there is a quick bulb release in the operation of the camera shutter, I provide the lever $e$ with a bent portion $ek$, see Fig. 3. Under these circumstances, the lever $f$ is raised by the arm C out of engagement with the projection F on the disk *a*. The disk *a* would continue to revolve until the arm A had moved a sufficient distance to allow the catch lever *e* to resume its original position by means of the spring attached thereto. Without the bent end *ek* the disk could only stop when the catch lever *e* again came into engagement with the projection F of the disk A.
As a matter of fact, owing to the position of the bent portion *ek*, the latter is moved so as to take a position nearer to the circumference of the disk *a* when the opposite end of the lever is moved away from it so as to engage the projection F on the disk *a*, thus stopping the rotation of said disk *a* after one revolution.

The connecting-bar *b*, shown in Fig. 3, is constructed as shown in Fig. 5, a shoulder being formed on each end, and one extension being slightly shorter than the other, the end of the shorter extension being fitted into a hole of similar diameter in the disk *a*, which acts as its bearing, and the longer extension being fitted into a similar hole in the slide *c*, which acts as its bearing. The slide *c* is held in position and slides freely in the guides *i*, *h* and *g*, shown in Fig. 3, being provided with a slot running lengthwise for a certain distance through its middle, as shown in Fig. 4, to avoid interference with the shaft P. When the disk *a* is released and rotates with the shaft P, the connecting-bar *b*, having one end of its bearings in the disk *a*, is carried downward, and said connecting-bar having its other bearing in the slide *c*, forces the slide *c* downward also, in distance according to the point at which the disk *a* is arrested in its rotation.
The construction of the slide *c* is shown in Fig. 6, being only sectionally shown in Fig. 3. The right angle projection shown opposite the side provided with the slot, extends through a suitable opening in the plate M, as shown in Fig. 1, and is provided with a thumb-screw for attaching suitable connections for operating the thumb-lever on the photographic camera to which the device is attached, the action of said slide being in either direction perpendicular to the top and bottom of said device.

The automatic stop, or shut-off, which serves to arrest the motion of the mechanical arrangement, after the arms A and C have moved a sufficient distance to perform their duty, with reference to the catch-levers *e* and *f*, is shown in Fig. 1. It consists of a rocker-arm *k*, one end of which fits into a bearing in the plate R, extends through the plate N, having its other end fitted into a bearing in the plate M; near the end of said rocker-arm having its bearing in the plate R, an arm *j* is fitted, said arm being held in place by a set-screw, which arm comes in contact with the arm C at a certain point in its movement; near the end of the rocker-arm *k* having its bearing in the plate M, the loop U in said rocker-arm is formed, which extends upward. To the center of said loop the one end of a spiral spring is attached, which spiral spring *s'* extends downward toward the base of the device, as shown in Fig. 2; secured to the rocker-arm *k* at a point in direct line with the disk *u*, as shown in Fig. 1, is a spring-arm *sa*, having a friction-shoe *fs* on its outer end, which, when the arm *j* attached to the opposite end of the rocker-arm *k* comes in contact with the arm C, and is raised a sufficient distance, the spiral spring attached to the loop U having a tendency to draw the spring-arm downward, since the action of said spiral spring is to draw in a downward direction, the direction of movement of the shaft of the rocker arm *k* will depend upon the direction of movement of the outer extremity of the loop U, comes in contact with the disk *u*, the friction caused by such contact being great enough to stop the rotation of the shaft X, and thus stop the further movement of the mechanical parts of the aforesaid device. Situated in the top of the case covering the device is a push-button D, shown in Fig. 3, having a shank which extends perpendicularly through a suitable opening in said case, being held in position by a suitable spring, and pin inserted through the shank of same, the end of said shank being so situated as to come in contact with the arm *j* when the shoe on the aforesaid spring-arm is resting against the disc *u*; thus, when the push-button D is forced downward, thereby forcing the arm *j* downward a sufficient distance, the spiral spring attached to the loop U has a tendency to draw the said arm *j* downward a certain distance in accordance with a suitable stop securely fixed in the plate R, and hold said arm in such position until the arm C comes in contact with said arm *j*, such movement of the said arm *j* raising the aforesaid spring-arm secured to the opposite end of the rocker-arm *k*, a sufficient distance to relieve the friction on the shoe on same against the disk *u*, and thus leaving the shaft X free to rotate and cause the mechanical parts of the device to perform their functions.

The face plate S, shown in Fig. 1, is a metal plate of light material, having an opening for the dial shown in Fig. 7, and having suitable supports and being attached to the plate R by means of suitable screws, as shown in Fig. 1, said plate merely serving as a covering for the front of the device. Thus, when the arm A and arm C are set in any certain position by means of the indicator hands *x* and *z*, and the governor, or speed regulator carried on the shaft X, as previously explained, is released and the auxiliary gearing set in motion, the ratchet-wheel L and the ratchet-wheel *d* are caused to rotate in the direction indicated by the arrow in Fig. 3, carrying with them the arms A and C; when the arm A comes in contact with the catch-lever *e*, and has raised same a sufficient distance, the disk *a* is released, and the coil-spring T, shown in Fig. 1, having been wound up by means of the thumb-head *t*, the said disk rotates in the direction indicated by the arrow in Fig. 1, until arrested by the catch-lever *f*, and the disk *a* being connected with the slide *c* by means of the connecting bar *b*, forces said slide *c* downward; when the arm C comes in contact with the catch-lever *f*, and has raised same a sufficient distance, the disk *a* is again released and continues its rotation until arrested by the catch-lever *e*, forcing the slide *c* back to its original position. The intervals of time between the movements of the slide *c* determine the time and length of exposure, such movements of said slide being governed by the position at which the arms A and C are placed on their respective ratchet-wheels, such positions being determined by the indicator hands and dial shown in Fig. 7.

Fig. 8 shows the method of attaching the device to a photographic camera, a thumb-screw being fitted at a suitable position in the bottom of the case which serves to attach the device to the clamp-bracket, and a similar thumb-screw fitted in the bottom of the clamp-bracket serves to attach same to the base of the photographic camera, as shown in Fig. 8. The projecting end of the slide being provided with a thumb-screw, any suitable connection may be devised to connect said slide with the thumb-lever which operates the shutter of the photographic camera to which said device is attached, since different manufacturers of photographic cameras have different methods of constructing same.

I claim—

1. In a shutter operating attachment for photographic cameras, a shutter operating slide adapted to be reciprocated, means under tension for reciprocating the slide, means for normally preventing the operation of said reciprocating means, means for releasing the reciprocating means so as to cause the operation of the slide, means for varying the period of the reciprocating movement of the slide, said last named means including a governor, and means for adjusting the governor.

2. In a shutter operating attachment for photographic cameras, a reciprocating shutter operating slide, means under tension for reciprocating said slide, means for normally preventing the operation of said slide operating means, and means including a train of gears and a trip arm carried thereby for releasing said slide means through the engagement of the trip arm with the means for normally preventing the operation of the slide operating means.

3. In a shutter operating attachment for photographic cameras, a reciprocating shutter-operating slide, means under tension for reciprocating said slide, means for normally preventing the operation of said slide reciprocating means, means including a train of gears and a trip arm carried thereby for releasing said slide reciprocating means through the engagement of the trip arm with the means for normally preventing the operation of the slide reciprocating means, means for normally preventing the movement of said train of gears and said trip arm, and means for releasing the train of gears and thereby permitting the movement of the trip arm.

4. In a shutter operating attachment for photographic cameras, a reciprocating shutter-operating slide, means under tension for reciprocating said slide, means for normally preventing the operation of said slide reciprocating means, means including a train of gears and a trip arm carried thereby for releasing said slide reciprocating means through the engagement of the trip arm with the means for normally preventing the operation of the slide reciprocating means, means for normally preventing the movement of said train of gears and said trip arm, means for releasing the train of gears and thereby permitting the movement of the trip arm, and means for adjusting the position of the trip arm to vary the time between the initial movement of the train of gears and the contact of the trip arm with the slide release means.

5. In a shutter operating attachment for photographic cameras, a reciprocating slide, means under tension for reciprocating the slide, means for normally rendering the last named means inoperative, a train of gears, a pair of arms connected therewith, one of said arms being arranged to release said slide operating mechanism to permit the operation of the slide in one direction, means for subsequently stopping the slide, the other of said arms serving to again release the slide operating means, thereby permitting the slide to return to its normal position.

6. In a shutter operating attachment for photographic cameras, a reciprocating slide, means under tension for reciprocating the slide, means for normally rendering the last named means inoperative, a train of gears, a pair of arms connected therewith, one of said arms being arranged to release said slide operating mechanism to permit the operation of the slide in one direction, means for subsequently stopping the slide, the other of said arms serving to again release the slide operating means, thereby permitting the slide to return to its normal position, and means for adjusting the relative position of the two arms to vary the time lapsing between the movement of the slide in one direction and its movement in the opposite direction.

In testimony whereof I affix my signature, in the presence of two witnesses.

HARRY C. ATWOOD.

Witnesses:
 CLARK N. LOWELL,
 ROY PRICE.

Copies of this patent may be obtained for five cents each, by addressing the "Commissioner of Patents, Washington, D. C."